United States Patent [19]
Hughes

[11] Patent Number: 5,454,665
[45] Date of Patent: Oct. 3, 1995

[54] ARTIFICIAL REEF

[75] Inventor: Robert K. Hughes, Sr., Fort Myers, Fla.

[73] Assignee: Flexstake, Inc., Fort Myers, Fla.

[21] Appl. No.: 254,235

[22] Filed: Jun. 6, 1994

[51] Int. Cl.⁶ .................................................. E02B 3/00
[52] U.S. Cl. ................................. 405/24; 405/28; 405/35
[58] Field of Search .................................. 405/15, 21, 24, 405/25, 26, 28, 35; 119/208

[56] References Cited

U.S. PATENT DOCUMENTS

| | | |
|---|---|---|
| 1,516,767 | 11/1924 | Falley . |
| 3,323,310 | 6/1967 | Arpin . |
| 3,540,415 | 11/1970 | Bromley . |
| 4,374,629 | 2/1983 | Garrett . |
| 4,437,786 | 3/1984 | Morrisroe . |
| 4,490,071 | 12/1984 | Morrisroe . |
| 4,950,104 | 8/1990 | Streichenberger . |
| 5,197,819 | 3/1993 | Hughes . |

Primary Examiner—David H. Corbin
Attorney, Agent, or Firm—Grady K. Bergen

[57] ABSTRACT

An artificial reef is formed for use in a body of water to provide a habitat for aquatic life. The reef is formed by providing an anchoring structure which is submerged in the body of water. The anchoring structure has a weight sufficient to anchor the artificial reef to the floor of the body of water. Spaced at intervals along the floor of the body of water and attached to the anchoring structure are a plurality of reef assemblies. Each of the reef assemblies is formed from a base which is secured to the anchoring structure. A flexible elastomeric sleeve is coupled to a lower end of a buoyant, elongated member formed from a substantially rigid polymeric material so that the elongated members are held in a general upright position. By providing a plurality of these reef assemblies, an artificial reef is formed. The elastomeric element of the reef assemblies allows the elongated members to pivot relative to their bases at the elastomeric element so that passing fishing nets or other objects may merely deflect the elongated members of the artificial reef. The artificial reef is restored to its original state after the object has passed by.

20 Claims, 2 Drawing Sheets

ARTIFICIAL REEF

BACKGROUND OF THE INVENTION

1. Field of the Invention

This invention relates to an artificial reef for use in a body of water to provide a habitat for aquatic life.

2. Description of the Prior Art

Fish and other aquatic life are naturally attracted to certain structures located below the surface of the water. Coral reefs, rock outcroppings and vegetation, for instance, all provide a natural habitat for supporting fish and other marine life. However, because there are a limited number of these naturally occurring environments, man-made reefs have been used in order to attract fish and other types of aquatic life. These artificial reefs have been created in the past by submerging old ships or boats, automobiles, used tires, concrete blocks and other objects which project from the bottom of the sea floor. In some instances, fishing nets and lines used in commercial and sport fishing can become entangled in these structures, resulting in damage to the nets or lines and in some cases to the reef itself. What is needed is an artificial reef that can be positioned at the bottom of a lake or sea body to provide a habitat for fish and which is constructed to prevent entanglement of passing fishing nets and lines.

SUMMARY OF THE INVENTION

An artificial reef is formed in a body of water to provide a habitat for aquatic life by providing an anchoring structure to which a reef assembly or plurality of reef assemblies are attached. Each reef assembly has a base which is secured to the anchoring structure. A flexible elastomeric sleeve is coupled to the base. Each reef assembly has a buoyant, elongated member formed from a substantially rigid polymeric material. The elongated member has a first end, which is coupled to the flexible elastomeric sleeve, and an opposite free end. The elastomeric sleeve and the buoyancy of the elongated member causes the free end to be suspended in the body of water so that the elongated members are in a generally upright position in the body of water. The elastomeric sleeve allows the elongated member to pivot relative to the base of the elastomeric sleeve, thus allowing the elongated member to be deflected when contacted by a passing object, such as a fishing net.

DETAILED DESCRIPTION OF THE INVENTION

Figure 1:
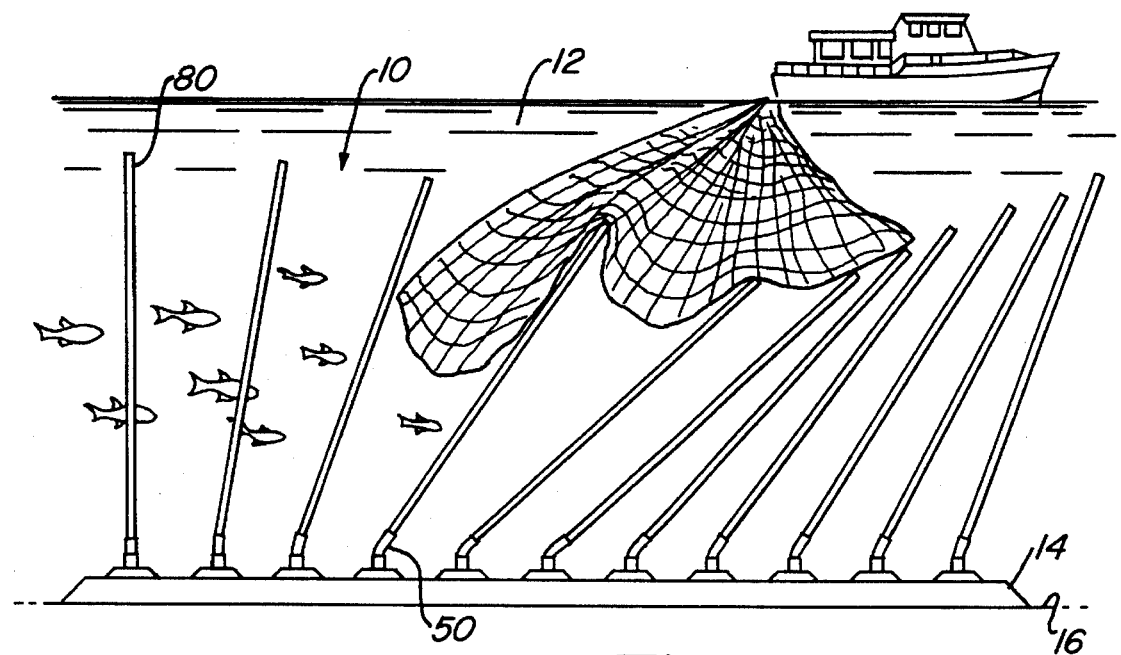
FIG. 1 shows a side view of an artificial reef constructed in accordance with the invention.

Referring to FIG. 1, an artificial reef 10 is shown submerged in a body of water 12. The artificial reef 10 has an anchoring structure 14 which is secured against a floor 16 of the body of water 12. The anchoring structure 14 should have a low profile when positioned at the bottom 16. The anchoring structure 14 can be formed from a heavy material, such as concrete, having a specific gravity substantially greater than that of water so that the weight of the structure 14 prevents the structure from being displaced from the floor 16. Alternatively, the anchoring structure 14 can be attached or moored to the floor 16 by means of cables or separate anchors secured to the floor 16. The anchoring structure 14 should be resistant to corrosion and deterioration from exposure to fresh or salt water for extended periods of time.

Figure 2:
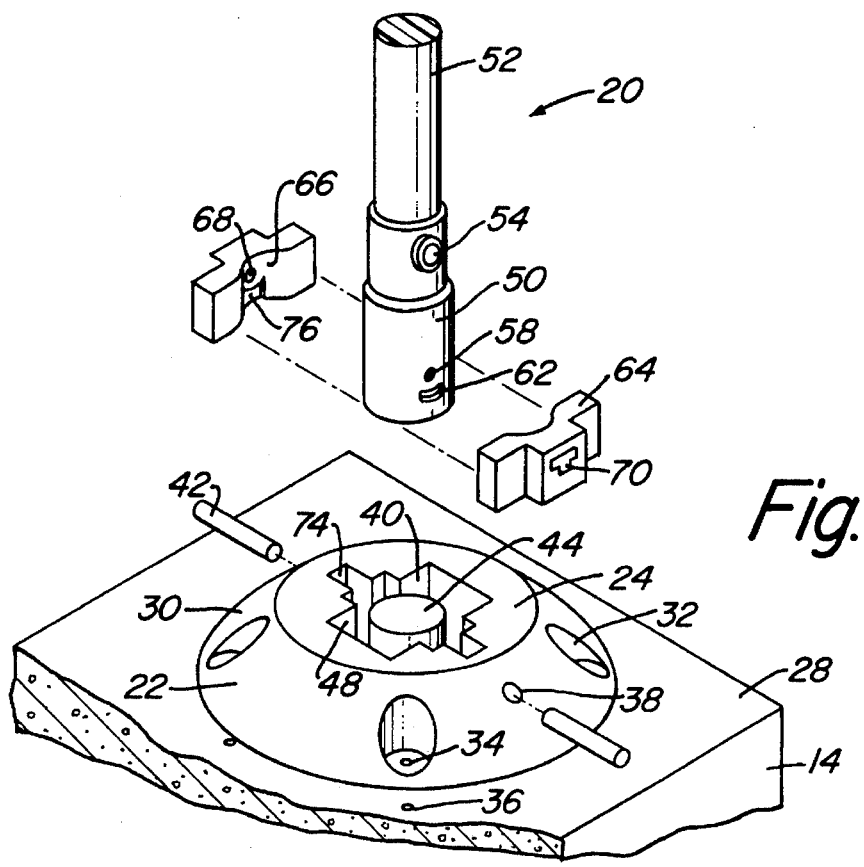
FIG. 2 shows a prospective view of a reef assembly of the artificial reef of FIG. 1 constructed in accordance with the invention.
Figure 3:
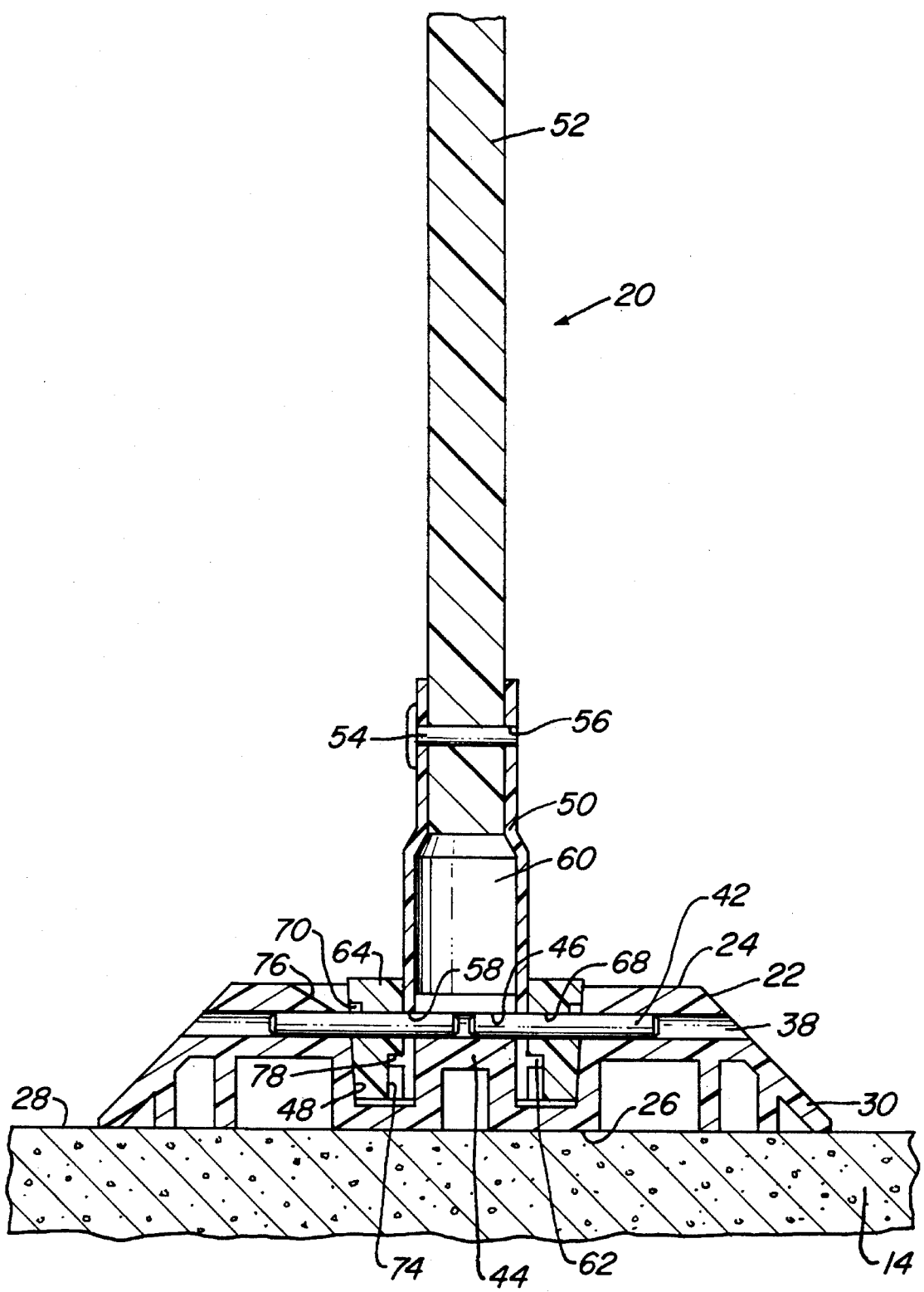
FIG. 3 shows a side cross-sectional view of the reef assembly of FIG. 2.

As shown in FIG. 1, a plurality of reef assemblies 20 are secured to the anchoring structure 14. Each reef assembly 20 should also be constructed of materials which do not corrode or deteriorate in either fresh or salt water. The reef assembly 20 (FIG. 2) includes a truncated conical base 22 having a flat upper surface 24 and a lower surface 26 (FIG. 3). The base 22 also has a relatively low profile. The lower surface 26 of the base 22 contacts and is secured against a flat, upper surface 28 of the anchoring structure 14. A conical sidewall 30 extends between the upper and lower surfaces 24, 26. Formed in the conical sidewall 30 are several sockets 32 provided with holes 34. The holes 34 are positioned so that they align with holes 36 formed in the surface 28 of the anchoring structure 14. This allows the base 22 to be secured to the anchoring structure 14 using suitable fasteners, such as screws or bolts (not shown) which extend through the holes 34, 36. The base 22 may also be secured to the surface 28 of the anchoring structure 14 by means of a suitable adhesive.

Formed in the conical sidewall 30 of the base 22 are locking pin holes 38. The locking pin holes 38 extend parallel to the upper surface 24 and terminate within a base cavity 40 formed in the upper surface 24 of the base 22. A pair of locking pins 42 are provided with the base 22 and are configured to insert into the holes 38.

A mandrel 44 extends upward from the bottom of the base cavity 40. The mandrel 44 is substantially cylindrical in shape and terminates in a flat upper surface. The mandrel 44 is also provided with holes 46 (FIG. 3) which are co-axially aligned with the holes 38 formed in the sidewall 30. The mandrel 44 is spaced apart from the walls 48 of the cavity 40 to provide a clearance.

Provided with each reef assembly 20 is an elastomeric sleeve 50 formed from a flexible polyurethane material. The sleeve 50 has a lower end which mounts over and secures to the mandrel 44 of the base 22. The upper end of the elastomeric sleeve 50 is secured to the lower end of a substantially straight, elongated member 52. The elongated member 52 is formed from a buoyant polymeric material such as extruded, foamed plastic, and has a substantially smooth exterior surface. The elongated member 52 is solid throughout and has substantially uniform cross section along its entire length.

The elastomeric sleeve 50 is formed from a molded polyurethane material. As shown in FIGS. 2 and 3, a fastener 54, such as a bolt or rivet, extends through a hole 56 located in the upper end of the sleeve 50 for securing the upper end of the elastomeric sleeve 50 to the buoyant member 52. The lower end of the elastomeric sleeve 50 is received within the clearance provided between the cavity wall 48 and the mandrel 44. The lower end of the sleeve 50 also has a hole 58 which aligns with the holes 38 and 46 of the base 22. Located on the exterior of the elastomeric sleeve 50 are a pair of lugs 62.

When the elastomeric sleeve 50 is fully mounted over the mandrel 44 and the lower end of the buoyant member 52 is secured to the upper end of the sleeve 50, a gap 60 is created between the lower end of the buoyant member 52 and the upper surface of the mandrel 44. This clearance or gap 60 allows the elastomeric sleeve 50 to bend freely or deform so that the buoyant member 52 is allowed to move or pivot at the elastomeric sleeve 50 relative to the base 22.

A pair of locking wedges 64 are provided with the base 22. Each locking wedge 64 has an inner surface 66 which is contoured to the exterior surface of the lower end of the elastomeric sleeve 50. A hole 68 is formed in each locking wedge 64 which corresponds to the holes 58 and 38 of the sleeve 50 and base 22. The locking wedges 64 are configured to wedge between the lower end of the sleeve 50 and the cavity wall 48. A screwdriver slot 70 is also formed in the locking wedges 64 so that the locking wedges 64 may be pried loose and removed from the base cavity 40 if it becomes necessary to disassemble the reef assembly 20. A recessed portion 74 is also provided in the base to provide access to the screwdriver slots 70 when the locking wedges 64 are positioned within the base cavity 40.

Located on the inner surface 66 of the locking wedges 64 are recessed portions 76 which correspond to the lugs 62 located on the lower end of the sleeve 50. The recessed portion 76 of each locking wedge 64, as shown in FIG. 3, has an upper shoulder 78 which abuts against the upper surface of the lug 62. With the flexible elastomeric sleeve 50 and the locking wedges 64 positioned within the base cavity 40, the locking pins 42 are inserted through the locking holes 38 of the base through the holes 68, 58 and 44 to further secure the elastomeric sleeve 50 to the base 22, as shown in FIG. 3.

The elastomeric sleeve 50 should have enough rigidity to hold an elongated member 52 of a given length and weight in an upright manner in air. However, if the length and weight of the elongated members 52 used to form the reef assembly 20 is too great, the elastomeric sleeve 50 may not have a sufficient rigidity to maintain the members 52 in an upright position before submerging the reef assembly 20. The buoyant nature of the elongated members 52, therefore, helps to maintain the members 52 in a generally upright position when the reef assemblies 20 are submerged, with the free end 80 of each buoyant member 52 being suspended in the body of water.

In forming the artificial reef 10, a plurality of the reef assemblies 20, as previously described, may be attached to a single, large anchoring structure 14 wherein a large number of the reef assemblies 20 are positioned at various intervals over the upper surface 28 of the anchoring structure 14. Alternatively, the reef assemblies 20 may each be secured to a single anchoring structure 14. The anchoring structure or structures 20 with the attached reef assemblies 20 are then submerged in the body of water 12 so that the anchoring structure(s) rests on the floor 16. If the reef assemblies 20 are each attached to a single anchoring structure 14, the anchoring structures 14 are spaced at various intervals along the floor 16 of the body of water 12.

Due to the weight of the concrete material used for the anchoring structure 14, the reef assemblies 20 are retained on the floor 16 of the body of water 12. The buoyancy of the elongated members 52 and the elastomeric sleeve 50 cause the elongated members 52 to be suspended in the body of water 12 in a generally upright manner so that a habitat for marine life is provided. When fishing boats trawl or pass over or near the artificial reef 10, nets and lines which may come in contact with the artificial reef 10 merely deflect the elongated members 52. The elastomeric sleeve 50 allows each buoyant member 52 to pivot relative to the base 22. The elongated members 52 are then restored to the upright position by the combined buoyancy of the members 52 and the resiliency of the sleeve 50.

The artificial reef of the invention is an improvement over the prior art artificial reefs in which structures were merely sunk to the floor of the body of water to provide a habitat. Because the elongated members are relatively straight and have a substantially smooth exterior surface, there is no tendency for nets and other objects to snag or become entangled with the artificial reef. When nets and other objects contact the reef, the elongated members are merely deflected so that the net passes by relatively unimpeded. The buoyant nature of the elongated members and the elasticity of the elastomeric sleeve restores the reef to its original and undeflected position or state.

While the invention has been shown in only one of its forms, it should be apparent to those skilled in the art that it is not so limited, but it is susceptible to various changes without departing from the scope of the invention.

I claim:

1. An artificial reef for use in a body of water to provide a habitat for aquatic life, the reef comprising in combination:

an anchoring structure which is submersed in the body of water and has a density and weight sufficient to anchor the artificial reef to a floor of the body of water; and a plurality of submerged reef assemblies which are spaced at various intervals on the anchoring structure, each reef assembly comprising:

a base which is effectively secured to the anchoring structure;

a flexible elastomeric element coupled to the base; and an elongated member formed from a substantially rigid polymeric material, the elongated member having a first end coupled to the flexible element and an opposite free end, the elongated member being held in a generally upright position in the body of water; and wherein the elastomeric element allows the elongated member to pivot relative to the base at the elastomeric element.

2. The artificial reef of claim 1, wherein:

the flexible elastomeric element is a sleeve which is mounted over and secured to the first end of the elongated member.

3. The artificial reef of claim 1, wherein:

the anchoring structure is a concrete slab.

4. The artificial reef of claim 1, wherein:

the elastomeric element has a length substantially less than the length of the elongated member.

5. The artificial reef of claim 1, wherein:

the base has an upward protruding mandrel; and the elastomeric element is a sleeve having a lower end and an upper end, the lower end of the sleeve mounting over and being secured to the mandrel of the base, and the upper end mounting over and being secured to the first end of the elongated member.

6. The artificial reef of claim 1, wherein:

the elongated members have a buoyancy that causes the free ends to be suspended in the body of water.

7. The artificial reef of claim 1, wherein:

the elongated member is an extruded, foamed plastic material.

8. A method of forming an artificial reef in a body of water to provide a habitat for aquatic life, the method comprising the steps of:

providing a plurality of bases;

providing a plurality of elongated members, each elongated member being formed from substantially rigid polymeric material having a first end and an opposite free end;

attaching the first end of each elongated member to one of the plurality of bases by means of a flexible elastomeric element so that the elongated member is allowed to pivot relative to said one of the plurality of bases at the elastomeric element;

submersing the plurality of bases with the attached elongated members in the body of water; and anchoring the plurality of bases to a floor of the body of water so that the elongated members are held in a generally upright position in the body of water.

9. The method of claim 8, wherein:

the step of anchoring the plurality of bases to the floor includes attaching the plurality of bases to an anchoring structure which has a density and weight sufficient to effectively anchor the plurality of bases with the attached elongated members to the floor of the body of water.

10. The method of claim 9, wherein:

the step of anchoring the plurality of bases comprises anchoring the bases to a concrete slab.

11. The method of claim 8, wherein:

the flexible elastomeric element is a sleeve which mounts over and secures to the first end of the elongated member.

12. The method of claim 8, wherein:

the elastomeric element has a length substantially less than the length of the elongated member.

13. The method of claim 8, wherein:

each base has an upward protruding mandrel; and the elastomeric element is a sleeve having a lower end and an upper end, the lower end of the sleeve mounting over and being secured to the mandrel of the base, and the upper end mounting over and being secured to the first end of the elongated member.

14. The method of claim 8, wherein:

the step of providing a plurality of elongated members includes providing a plurality of buoyant, elongated members; and the step of anchoring the plurality of bases includes anchoring the plurality of bases to the floor of the body of water so that the buoyancy of the elongated members cause the free ends of the elongated members to be suspended in the body of water.

15. The method of claim 8, wherein:

the elongated member is formed from an extruded, foamed plastic material.

16. A method of forming an artificial reef in a body of water to provide a habitat for aquatic life, the method comprising the steps of:

providing a plurality of bases;

providing a plurality of buoyant, elongated members, each elongated member being formed from substantially rigid polymeric material having a first end and an opposite free end;

attaching the first end of each elongated member to one of the plurality of bases by means of a flexible elastomeric sleeve which mounts over and is secured to the first end of the elongated member so that the elongated member is allowed to pivot relative to said one of the plurality of bases at the elastomeric sleeve;

submersing the plurality of bases with the attached elongated members in the body of water; and anchoring the plurality of bases to a floor of the body of water so that the buoyancy of the elongated members causes the free ends of the elongated members to be suspended in the body of water so that the elongated members are in a generally upright position in the body of water.

17. The method of claim 16, wherein:

the step of anchoring the plurality of bases to the floor includes attaching the plurality of bases to an anchoring structure which has a density and weight sufficient to effectively anchor the plurality of bases with the attached elongated members to the floor of the body of water.

18. The method of claim 16, wherein:

each base has an upward protruding mandrel; and the elastomeric sleeve has a lower end and an upper end, the lower end of the sleeve mounting over and being secured to the mandrel of the base, and the upper end mounting over and being secured to the first end of the elongated member.

19. The method of claim 16, wherein:

the elastomeric sleeve is formed from polyurethane.

20. The method of claim 16, wherein:

the elongated member is formed from an extruded, foamed plastic material.

* * * * *